March 20, 1956 W. H. WILKINSON 2,738,949
GAS-TURBINE ENGINES AND NOZZLE-GUIDE-VANE ASSEMBLIES THEREFOR
Filed June 12, 1951 3 Sheets-Sheet 1

INVENTOR
W. H. WILKINSON
By Wilkinson + Mawhinney
ATTYS.

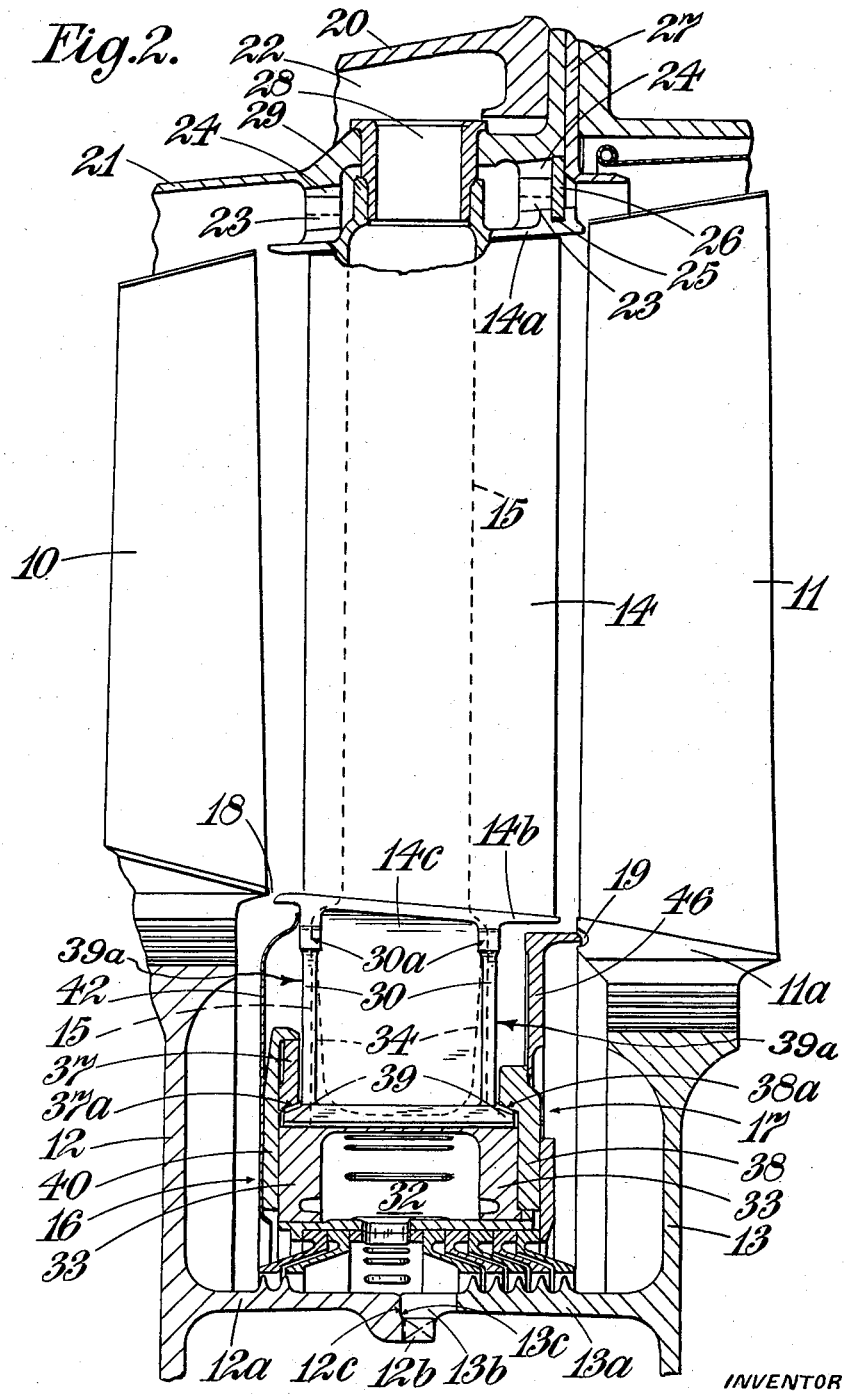

March 20, 1956 W. H. WILKINSON 2,738,949
GAS-TURBINE ENGINES AND NOZZLE-GUIDE-VANE ASSEMBLIES THEREFOR
Filed June 12, 1951 3 Sheets-Sheet 3
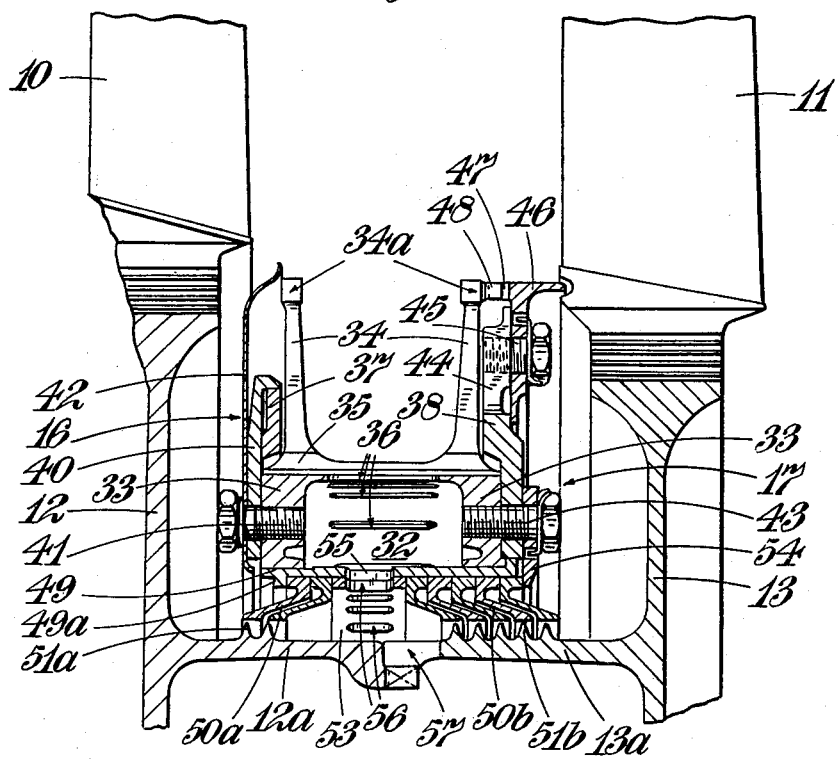
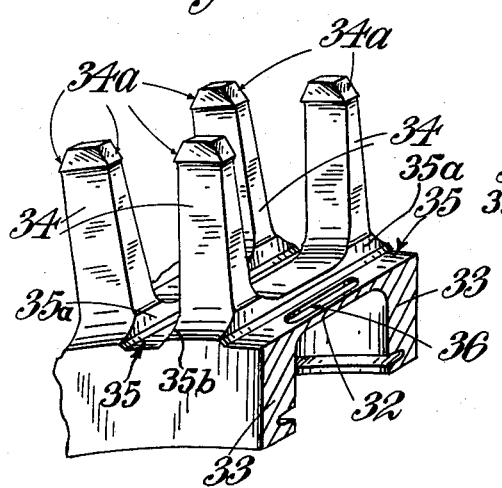
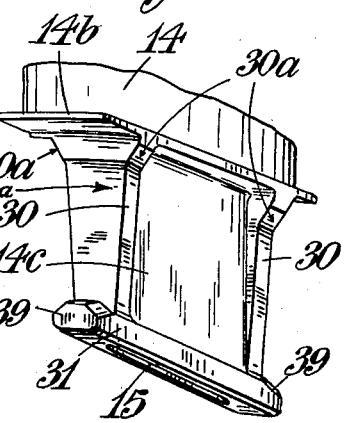
INVENTOR
W. H. WILKINSON
By Wilkinson + Mawhinney
ATTYS.

United States Patent Office 2,738,949
Patented Mar. 20, 1956

2,738,949

GAS-TURBINE ENGINES AND NOZZLE-GUIDE-VANE ASSEMBLIES THEREFOR

Wilfred Henry Wilkinson, Turnditch, England, assignor to Rolls-Royce Limited, Derby, England, a British company Application June 12, 1951, Serial No. 231,092

Claims priority, application Great Britain April 23, 1951

5 Claims. (Cl. 253—39.1)

This invention relates to gas-turbine engines and is concerned with gas-turbine engines comprising axial-flow turbines having a nozzle-guide-vane assembly at the entry to a stage of turbine rotor blading.

Since the pressure of the hot gases flowing through the turbine is higher than atmospheric pressure, there is a tendency for the hot gases to flow radially inwardly through the clearance gap between the turbine rotor and the nozzle-guide-vane assembly or associated stationary structure. Such a flow is undesirable since it would result in heating of the surface of the turbine rotor disc.

To avoid this heating, it is common practice to supply to adjacent the surface of the turbine disc relatively cool air which is at a pressure higher than the pressure of the hot gases passing through the turbine system, so that there is a radially outward flow of relatively cool air through each clearance gap, whereby the clearance gaps are "sealed" against the inward flow of hot gas and the turbine rotor disc and rotor blade root fixing are maintained at a relatively low temperature.

Such an air supply has hitherto been derived from an auxiliary fan or from the engine compressor and conveyed by means of air supply pipes or conduits to within the engine casing. This may be undesirable or impracticable, as for example when it is desired to "seal" the clearance gaps between the adjacent faces of two adjacent rotor discs and a nozzle-guide-vane assembly intermediate the two discs, and to cool the said adjacent faces.

In the specification of copending application Serial No. 231,091 (P. E. Hunter) there is described an improved means for supplying cooling and sealing air to the clearance space between a turbine rotor and nozzle-guide-vane assembly which means includes hollow nozzle-guide vanes through which the air is conveyed across the turbine working fluid annulus.

This invention comprises an improved nozzle-guide-vane assembly as set forth in the above-mentioned application, and has for an object to provide an improved means for delivering the cooling and sealing air from the vanes into the clearance spaces.

According to this invention, the nozzle-guide-vane assembly comprises a plurality of hollow vanes, each of which vanes is provided at its inner end with a radially-elongated root portion with an air passage extending radially through it from the passage in the vane, which root portion has, at each of its axially-spaced ends and adjacent the vane, oppositely and circumferentially-facing outer locating surfaces, and has its part remote from the vane formed with circumferentially-facing inner locating surfaces extending axially across the root portion, an annular member in which the vanes are positioned by each vane having said outer and inner locating surfaces engaging correspondingly-disposed surfaces on the annular member, and clamping means to hold the outer and inner locating surfaces in contact with said correspondingly-disposed surfaces of the annular member, there being registering apertures in the annular member and the ends of the root portions remote from the vanes to permit the air to pass from the passages in the vanes to within the annular member.

The improved construction not only ensures the proper supply of cooling and sealing air to the clearance spaces but also affords an accurate means of locating the vanes at their inner ends against movement relative to the annular member in any direction.

Preferably the annular member is formed at each of its axially-spaced edges with radially-outwardly-projecting horns and the said correspondingly-disposed surfaces to contact said outer locating surfaces are formed on the tips of the horns, and the correspondingly-disposed surfaces to contact the inner locating surfaces are formed as parts of a channel extending across the annular member between the bottoms of tapering spaces between aligned pairs of horns. The clamping means may conveniently comprise rings with conical inwardly-facing surfaces which engage chamfered toes extending axially from the axially-spaced ends of the root portions; when the rings are clamped axially to the annular member, the locating surfaces are brought firmly together by the root portion being pressed radially inwards into the spaces between aligned pairs of horns.

Preferably the annular member encircles and carries within it part of a labyrinth sealing means and the cooling air may pass from within the annular member to a clearance space through the labyrinth sealing means. Where the nozzle-guide-vane assembly is between two rotors the annular member may encircle and carry parts of a pair of axially-spaced labyrinth seals and the cooling and sealing air may flow from within the annular member to the upstream side of the annular member through one labyrinth seal, and to the downstream side of the annular member through the second labyrinth seal which is made of greater restriction since the pressure on the downstream side is lower than on the upstream side.

The outer ends of the vanes may engage the engine stationary structure in any convenient manner and for instance may be located relative thereto against axial and circumferential movement but free for radial movement.

One nozzle-guide-vane assembly embodying the above and other features of the invention will now be described with reference to the accompanying drawings in which—

Figure 2 is a section on the line 2—2 of Figure 1,

Figure 3 is a view similar to Figure 2 but with the guide-vanes removed,

Figure 4 is a perspective view of a portion of an element of the assembly, and

Figure 5 is a perspective view of the root portion of a nozzle guide vane.

Figure 1:
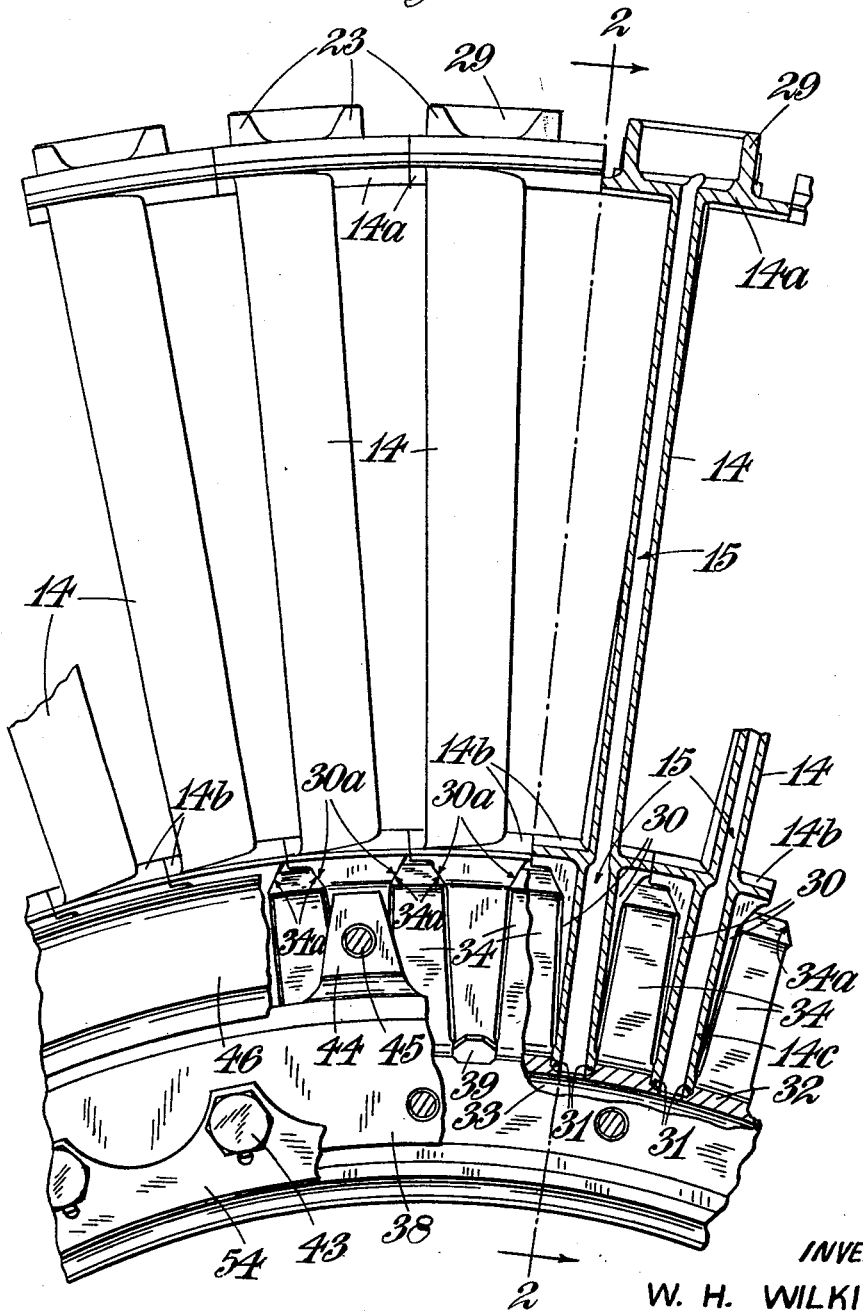
Figure 1 is an axial view of part of the assembly with parts broken away.

Referring to the drawings, the nozzle-guide-vane assembly illustrated is arranged between two stages 10, 11 of rotor blading of an axial-flow turbine, the blades 10, 11 being mounted respectively on turbine discs 12, 13 which are held in their appropriate spaced relation adjacent their peripheries by cylindrical extensions 12a, 13a having abutment surfaces 12c, 13c and interengaging toothed parts 12b, 13b.

The embodiment illustrated provides nozzle guide vanes 14 having outer platforms 14a and inner platforms 14b, which form annular sections of the turbine channel walls, and elongated root portions 14c extending inwardly from the under sides of the inner platforms 14b, which guide vanes have air passages 15 extending through them from their outer ends to the inner ends of the elongated roots 14c to convey cooling and sealing air across the working fluid annulus to the clearance spaces 16, 17 between the inner end of the nozzle-guide vane assembly and the rotor discs 12, 13, thereby to prevent the inward flow of hot gas from the working fluid annulus through sealing gaps 18, 19 into the clearance spaces 16, 17.

The nozzle guide vanes 14 are engaged with the turbine casing structure in a manner to permit radial freedom of the platform 14a.

The stationary structure comprises an outer wall 20 and an inner wall 21 forming a cooling and sealing air manifold 22 from which the cooling and sealing air is delivered to the guide vanes 14. The outer platforms 14a of the guide vanes are provided on their outer surfaces with tooth-like projections 23 which interlock with projections 24 on the inner wall 21 to locate the outer ends of the guide vanes 14 circumferentially with respect to the walls 20, 21. The platforms 14a are also grooved circumferentially as at 25 to embrace the inner edge of a flat ring 26, the outer edge of which is disposed between the downstream set of projections 24 and a shoulder afforded by a plate 27 which is bolted to the walls 20, 21 and projects inwardly beyond them; this arrangement ensures that the outer ends of the guide vanes 14 are located axially with respect to the turbine stationary structure. As will be seen there is freedom for radial movement between the projections 23, 24 and also between the outer platform 14a and the ring 26 and thus the engine stationary structure.

The cooling air is fed into the passages 15 from the manifold 22 by nozzles 28 which slidingly engage holes in the wall 21 and also socket-forming necks 29 on the platforms 14a.

The nozzle guide vane may be engaged with the outer stationary structure in any other desired or convenient manner.

The nozzle-guide vanes have their root portions 14c located in all directional senses and the following structure is employed for the purpose in this embodiment.

Each root portion 14c is made of substantially rectangular and substantially uniform section being of an axial dimension only slightly less than the inner platform 14b and being of a circumferential dimension which is small compared with that of the inner platform 14b. The axially-spaced end surfaces of the root portions are extended circumferentially in both directions to afford on the root portion circumferentially-directed extensions in the form of four webs 30 which taper in circumferential dimension in a direction away from the platform 14b, that is from their outer ends to their inner ends.

Adjacent their outer ends, the webs are formed with accurately machined oppositely- and circumferentially-facing flats 30a which form outer locating surfaces and the inner end of the root portion 14c is also accurately machined as indicated at 31 to form circumferentially-facing inner locating surfaces extending axially across the root portion (Figures 1 and 5). These accurately machined surfaces 30a, 31 afford the means whereby a guide vane 14 is located in the inner locating structure of the guide-vane assembly.

The inner locating structure comprises a ring 32 (see particularly Figure 4) having at each of its axially-spaced edges an inwardly projecting flange 33 and a series of axially-aligned pairs of outwardly-directed outwardly-tapering horns 34 the number of which is equal to the number of vanes 14. Each horn 34 has accurately machined on it adjacent its tip a pair of flats 34a to cooperate with the flats 30a forming circumferentially-facing surfaces on the webs 30 and the ring 32 is machined accurately between the bottoms of adjacent pairs of aligned horns 34 to provide a channel 35 having circumferentially- and radially-facing surfaces 35a and 35b to cooperate with the inner end 31 of the root portion 14c. The ring 32 may conveniently be formed by gashing the outer flanges of an H-sectioned ring.

A series of slots 36, one for each vane 14, are formed in the ring 32 at the bottom of the channelled surfaces 35, and the cooling and sealing air flows from the passages 15 through the slots 36 into the space between the flanges 33 on the ring 32.

The vanes 14 are held in position in the ring 32 by means of a pair of clamping rings 37, 38 which have conical surfaces 37a, 38a, which surfaces engage chamfered upper surfaces of toes 39 projecting axially from the inner edges of the axially-facing surfaces 39a of the root portion 14c.

The ring 37 is held in position by a retaining ring 40 which is secured by setscrews 41 to the ring 32 and the setscrews also hold a sealing plate 42 in position, the plate 42 acting to prevent air flow from clearance space 16 between the blades to space 17.

On clamping the rings 37, 38 axially to the ring 32, the root portions 14c are pressed down into the tapering spaces between the horns 34 with the surfaces 30a, 34a and 31, 35 properly in contact.

The ring 38 is held in position on the ring 32 by setscrews 43 and is formed at intervals with lugs 44 (Figure 3) to which is bolted by studs 45 a labyrinth-seal-forming member 46. The member 46 co-operates with the platforms 11a of the rotor blades 11 to form sealing gap 19. The member 46 is formed at intervals with features 47 which interlock with projections 48 from the tips of some of the horns 34 on the downstream edge of the ring 32.

Brazed or otherwise bonded to the flanges 33 there is a seal-carrying sleeve 49 within which is received two sets of labyrinth seal members 50a, 50b which co-operate with peripheral ridges 51a, 51b on the cylindrical extensions 12a, 13a to form the labyrinth seals, there being more members 50b than members 50a. The sets 50a, 50b are spaced axially apart by a ring 53 and are held in sleeve 49 by abutting at the ends of the assembly against a flange 49a on sleeve 49, and against an annular end plate 54 which is bolted to ring 32 by the setscrews 43. Registering slots 55, 56 are formed in the sleeve 49 and spacer ring 53 respectively to permit the cooling and sealing air entering the space between flanges 33 to flow into the space between the two labyrinth seals 50a, 51a and 50b, 51b. Cooling and sealing air leaks through these labyrinth seals into the spaces 16, 17 and thus prevents hot gas flowing inwardly from the working fluid annulus into these spaces.

A series of ports 57 are provided on the cylindrical extensions 12a and 13a to permit cooling and sealing air to pass into the space between the inner portions of discs 12, 13.

I claim:

1. A nozzle-guide-vane assembly comprising a plurality of radially-extending hollow vanes each having a passage extending radially therethrough, each of which vanes is provided at its free end with a radially-elongated root portion with an air passage extending radially through it from the passage in the vane, which root portion has, adjacent the vane, oppositely- and projecting circumferentially-facing outer locating surfaces, and has its part remote from the vane formed with circumferentially-facing inner locating surfaces extending axially across the root portion, an axially-extending ring formed with aligned pairs of circumferentially spaced and radially-outwardly-projecting horns, one horn of each pair being at each of its axially-spaced edges, said horns being formed at their tips with circumferentially-facing surfaces engaging said outer locating surfaces of the root portions, and said ring having generally axially-extending channels formed to extend across it between the aligned pairs of horns to afford circumferentially-facing surfaces engaging the inner locating surfaces of the root portions, and clamping means holding each root portion to the ring with the outer and inner locating surfaces on the root portion in contact with the respective circumferentially-facing surfaces of the horns and ring, there being registering apertures in the ring and said parts of the root portions remote from the vanes to permit the air to pass from the passages in the root portions to radially inwards of the ring.

2. A nozzle-guide-vane assembly as claimed in claim 1, wherein said clamping means comprise rings with conical radially-inwardly-facing surfaces and the axially-spaced ends of the root portions are provided with radially-outwardly-facing axially-extending chamfered toes engaged by the conical surfaces of the rings.

3. A nozzle-guide-vane assembly as claimed in claim 1, wherein the root portion of each vane has a platform portion between it and the vane and has a substantially uniform and substantially rectangular section being of a circumferential dimension less than that of the platform, and wherein the root portion is provided at its axially-spaced ends with circumferentially-directed extensions which taper in a direction radially-inwardly away from the platform and which are provided adjacent the platform with flats affording said circumferentially projecting outer locating surfaces.

4. A nozzle-guide-vane assembly as claimed in claim 3, wherein said clamping means comprise rings with conical radially-inwardly-facing surfaces and the axially-spaced ends of the root portion are provided with radially-outwardly-facing axially-extending chamfered toes engaged by the conical surfaces of the rings.

5. A nozzle-guide-vane assembly comprising a plurality of radially-extending hollow vanes each having a passage extending radially therethrough, each of which vanes is provided at its free end with a radially-elongated root portion with an air passage extending radially through it from the passage in the vane, which root portion has, adjacent the vane, outer locating surfaces which are inclined to be oppositely-directed and radially- and circumferentially-facing and which project circumferentially, and which root portion has its part remote from the vane formed with circumferentially-facing inner locating surfaces extending axially across the root portion, an axially-extending ring formed with aligned pairs of circumferentially spaced and radially-outwardly-projecting horns, one horn of each pair being at each of its axially-spaced edges, the horns on one edge being aligned with those on the other edge, said horns being formed at their tips with locating surfaces which are inclined to be oppositely-directed and radially- and circumferentially-facing, and which engage said outer locating surfaces of the root portions, and said ring having generally axially-extending channels formed to extend across it between the aligned pairs of horns to afford circumferentially-facing surfaces engaging the inner locating surfaces of the root portions, and clamping means holding each root portion to the ring wtih the outer and inner locating surfaces on the root portion in contact with the respective surfaces of the horns and ring, there being registering apertures in the ring and said parts of the root portions remote from the vanes to permit the air to pass from the passages in the root portions to radially inwards of the ring.

References Cited in the file of this patent

UNITED STATES PATENTS

| 2,319,846 | Carlson | May 25, 1943 |
| 2,488,867 | Judson | Nov. 22, 1949 |
| 2,488,875 | Morley | Nov. 22, 1949 |
| 2,606,741 | Howard | Aug. 12, 1952 |
| 2,625,367 | Rainbow et al. | Jan. 13, 1953 |

FOREIGN PATENTS

| 359,350 | Great Britain | Oct. 22, 1931 |
| 383,506 | Germany | Oct. 13, 1923 |
| 617,472 | Great Britain | Feb. 7, 1949 |

OTHER REFERENCES

Serial No. 385,333, Schutte (A. P. C.), published May 26, 1943.